(No Model.)

W. H. HALEY.
HAY LOADER.

No. 440,105. Patented Nov. 4, 1890.

Witnesses:
Jas. H. Lloyd
Tom M. Fitzgerald

Inventor
William H. Haley

UNITED STATES PATENT OFFICE.

WILLIAM H. HALEY, OF FLOYD, IOWA.

HAY-LOADER.

SPECIFICATION forming part of Letters Patent No. 440,105, dated November 4, 1890.

Application filed September 19, 1889. Serial No. 324,467. (No model.)

*To all whom it may concern:*

Be it known that I, WILLIAM H. HALEY, a citizen of the United States, residing at Floyd, in the county of Floyd and State of Iowa, have invented a new and useful Attachment to a Horse-Rake for the Purpose of Loading Hay, of which the following is a specification.

This invention has relation to a hay-loading attachment for horse hay-rakes, the attachment being of that class wherein are employed a series of endless belts operated by a gear moving with the axle of the rake, and among the objects in view are to simplify the construction, reduce the number of parts, and render the machine as a whole exceedingly durable and efficient.

Other objects and advantages of the invention will hereinafter appear, and the novel features thereof will be particularly pointed out in the claims.

Figure 1:
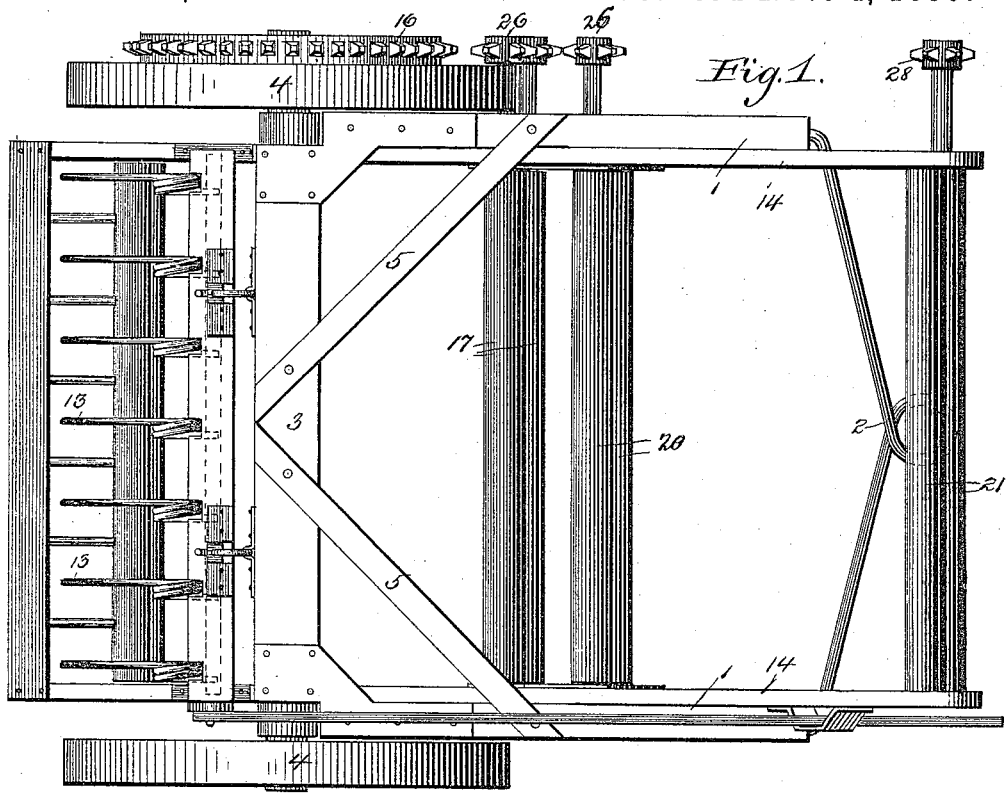
Figure 2:
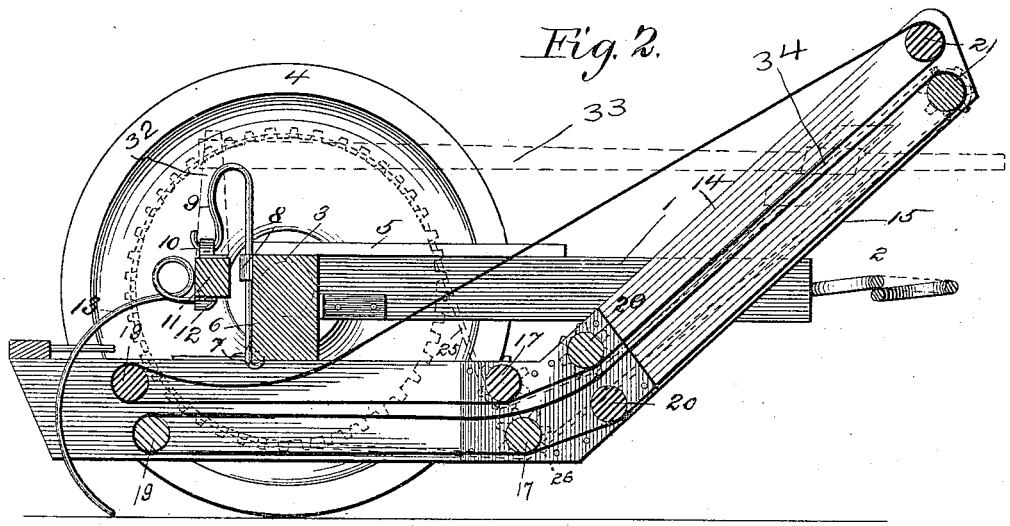

Referring to the drawings, Figure 1 is a plan of a horse hay-rake provided with an attachment constructed in accordance with my invention, the endless carriers and sprocket-chain being removed. Fig. 2 is a longitudinal vertical section of the same.

Like numerals of reference indicate like parts in all the figures of the drawings.

The frame-work of the rake comprises the opposite side bars 1, which at their front ends are connected by a draft-bail 2, the rear ends of the bars being connected by a transverse axle 3, provided at its ends with bearings, each of which carries a ground-wheel 4. The axle and side bars 1 are braced by means of a pair of diagonal braces 5 and may be otherwise strengthened, if desired. The rear face of the axle 3 is provided with a series of vertical standards 6, the lower ends of which are bent upon themselves to form hooks 7, which are driven into the under edge of the axle, and above said hooks the standards are clipped, as at 8, to the axle. The upper ends of the standards are bent to form depending suspension-hooks 9, each of which receives a loop 10, provided at intervals upon the rake-head 11, which latter has a series of sockets 12 located under the same to receive the rake-teeth 13, which are of the usual construction. By the construction described it will be seen that the rake-head with its entire series of teeth is loosely suspended in rear of its axle.

The attachment comprises in the make-up of its frame two opposite side bars 14, each of which is secured to one side or near one end of the axle and below the same, and the forward portions or halves of the side bars 14 are upwardly disposed, as at 15, and project beyond the draft-bail 2 of the rake.

The wheel 4 at one side of the rake has made fast therewith a large master-gear 16, and the frame or side bars 14 of the attachment have journaled between the same and slightly in advance of the rake-teeth 13 a pair of rolls 17. Similar pairs of rolls 19, 20, and 21 are journaled between the side frames 14, the latter pair of rolls occurring at the upper end of the frame and the rolls 17 and 20 at the angle or lower end of the upwardly-disposed portion 15, as shown.

25 represents an endless chain passed over the master-gear 16, under and meshing with small pinions 26 of the upper rolls 17 and 20, around the pinion 28 of the upper lower roll 21, and under the pinion 26 of the lower roll 17, so that when the machine is in motion the rolls 17, 19, 20, and 21 all move in unison. The upper rolls 17, 19, 20, and 21 are connected by an endless belt or apron 30, and the lower companion rolls are connected by a similar belt or apron 31.

By the construction and arrangement of the parts as described it will be seen that when the rake is in motion the two endless aprons will have their adjacent portions moving in the direction indicated by the arrows, and that as the hay is collected by the teeth the same is caught between the revolving rolls 17 and their aprons, and carried by the latter to the upper end of the elevator and there discharged into the wagon to which the rake is attached.

The rake-head 11 is provided with a lever 32, projecting upwardly from one end of the same, and connected to the upper end of the lever is an operating-rod 33, the forward end of which is adjustably connected in a locking device 34 secured to the adjacent side of one of the side bars 14 of the attachment. By means of this lever the rake head and teeth may be swung up so that the teeth will be withdrawn from contact with the ground.

Having thus described my invention, what I claim is—

1. The combination, with the side bars 1, axle 3, the ground-wheels 4, the master-gear 16, and the rake head and teeth, of the opposite side bars 14, upwardly disposed at their front ends and supported by the axle, and provided with the series of pairs of rolls, the endless aprons connecting the upper and the lower rolls of the series and spaced apart, gears mounted on the two central upper and one of the central lower rolls and the upper end roll, and a sprocket-chain connecting the master-gear with the gears of the rolls, substantially as specified.

2. The combination, with the side bars 1, axle 3, the ground and sprocket wheels 4 and 16, and the rake-head suspended in rear of the axle, of the opposite side bars 14, upwardly disposed at their front ends, the rolls 19 at the rear end of the bars in front of the rake, the opposite pairs of rolls 17 and 20 occurring at the angle of the side bars, and the upper pairs of rolls 21, the lower one of which is provided with a gear, and gears mounted on the upper roll of each central pair and the rear lower roll of said pair, opposite belts connecting the upper and lower series of rolls, and a sprocket-chain mounted over the master-gear and connected with the gears of the rolls, substantially as specified.

3. In a hay-rake, the combination, with the axle, the rear face of which is provided with clips, of the suspension-hooks 9, mounted therein and having their lower ends bent under and driven into the axle, the rake-head 11, having eyes 10 engaging the hooks 9, and upon its under side provided with the series of sockets 12, and the rake-teeth 13, secured in said sockets and depending below the axle, substantially as specified.

Signed at Charles City, Floyd county, this 16th day of March, 1889.

WILLIAM H. HALEY.

Witnesses:
THOMAS M. FITZGERALD,
H. J. FITZGERALD.